UNITED STATES PATENT OFFICE.

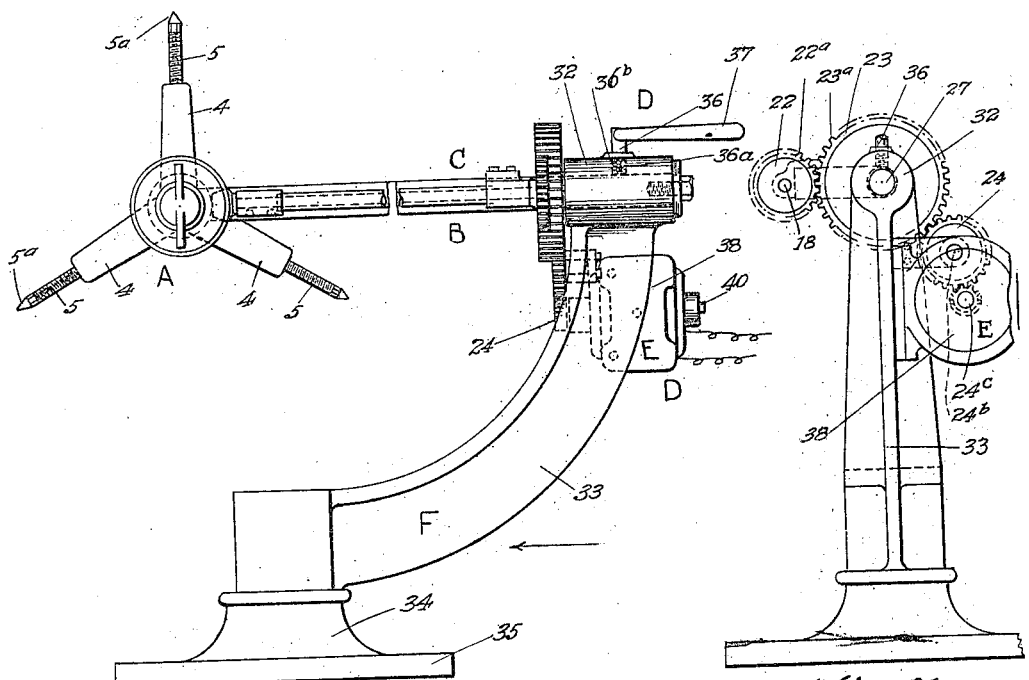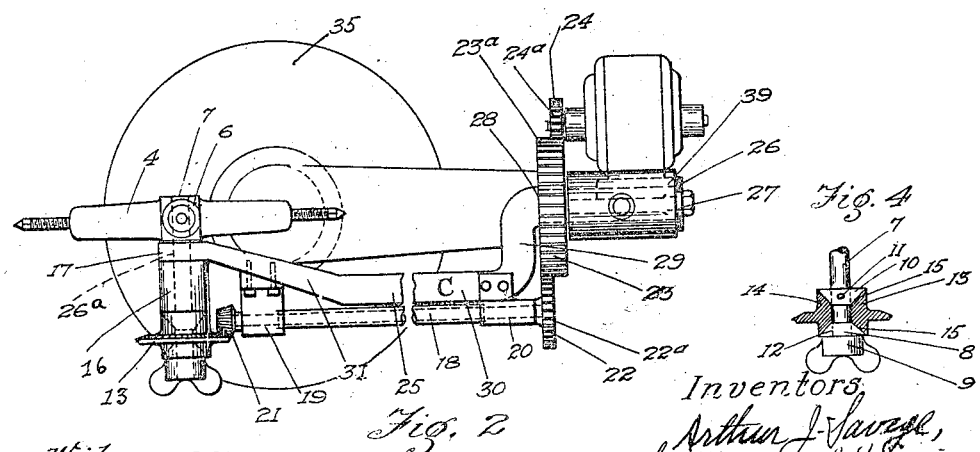

ARTHUR J. SAVAGE AND HOWARD I. MORRIS, OF SAN DIEGO, CALIFORNIA, ASSIGNORS TO THE SAVAGE TIRE COMPANY, OF SAN DIEGO, CALIFORNIA, A CORPORATION OF CALIFORNIA.

TIRE-FINISHING STAND.

1,317,526.                Specification of Letters Patent.        Patented Sept. 30, 1919.

Application filed December 1, 1916. Serial No. 134,482.

*To all whom it may concern:*

Be it known that we, ARTHUR JOHN SAVAGE and HOWARD I. MORRIS, both citizens of the United States, residing at San Diego, in the county of San Diego and State of California, have jointly invented new and useful Improvements in Tire-Finishing Stands, of which the following is a specification.

This invention relates to tire-finishing stands, and more particularly to tire finishing stands in which a rotatable, driven work holding member is employed in tire-making or tire-finishing and in which said member may be rotatably disposed in any required plane, as it is sometimes desirable to change the plane of rotation of a tire during the manufacture thereof without removing the same from a particular machine or stand.

The invention has for its object to provide a stand of this general nature upon which a tire carcass or the like may be mounted and be rotated in a plurality of planes and in which shifting of the plane of rotation may be readily accomplished as by simply releasing or unclamping a supporting member upon which the driven rotatable member is mounted and by simply manually forcing the rotatable member into the desired plane of rotation in which the supporting member may be secured or clamped until it is desired to again change the plane of rotation of the driven member, such change of plane of rotation being made without the necessity of cutting off the power employed to rotate the work holding driven member. A tire stand organized in accordance with the invention will rotatably support a tire carcass or the like through the medium of a chuck constituting the rotatable member and a standard core such as are ordinarily employed in the building of casings for pneumatic tires and in position for necessary tire-making or tire-finishing operations, and through suitable transmission means power may be transmitted from a source of energy to the chuck to rotate the same in a vertical plane or in a plane at any angle thereto; furthermore the parts shifted in shifting the work from one plane of rotation to another are not cumbersome and therefore may be readily shifted and the axis about which said shifting takes place preferably bisects the plane of rotation of the chuck as well as the axis of rotation thereof. The transmission preferably includes a rotatable gear wheel mounted to rotate about the axis about which the plane of work rotation is shifted and a transmission shaft is preferably provided at one side of such axis and parallel thereto to transmit power from the gear to the rotatable member or chuck through suitable devices, the chuck-supporting shaft being preferably at right angles to the transmission shaft. A pinion is provided at one end of the transmission shaft, namely the end adjacent to the gear, and a further drive pinion is arranged to mesh with such gear, the gear being of sufficient breadth of face to accommodate the relatively narrow transmission shaft pinion at a portion of its face and the relatively narrow drive pinion at another portion of its face so that the transmission shaft with its pinion mounted in a suitable chuck supporting frame, may be rotated about the gear, to the end that, such shaft and pinion may assume various positions of adjustment made necessary by the adjustment of the rotatable chuck in various planes of rotation. The relatively narrow transmission shaft pinion being in mesh with the ends of the teeth of the gear lying in its plane of rotation, and the relatively narrow drive pinion meshing with the ends of the teeth of the gear in its plane of rotation, the transmission shaft pinion may easily pass the end of the drive pinion shaft without interference, clearance being provided to that end. A suitable main frame to support the transmission shaft and chuck carrying frame is provided and the motor the shaft, of which carries a motor shaft pinion may be bolted or otherwise secured to such frame in position to constantly maintain the motor shaft in mesh with the drive pinion. The gear may be directly mounted upon a portion of the chuck carrying frame lying in the axis about which the plane of chuck rotation is shifted and a further portion of the chuck carrying frame may be suitably journaled in the main frame and likewise on the axis of rotation about which the plane of chuck rotation is shifted. Clamping means may be provided for maintaining the chuck carrying frame in any desired position of adjustment. Suitable clutch means may be provided for freeing the chuck or its shaft from the transmission shaft so that the rotation of the chuck and the work carried thereby may be interrupted at will.

A further object of the invention is to provide a stand of the general character stated which will be relatively simple and inexpensive in construction and organization when its features of superiority in facility of adjustment and positiveness in action are considered, which will be long of life and not liable to get out of order and which will be generally superior in efficiency and serviceability.

With the above and other objects in view, the invention consists in the novel and useful provision, formation, combination and relative arrangement of parts, members and features, all as hereinafter described, shown in the drawing, and finally pointed out in claims.

In the drawing:

Figure 1 is a side elevation of a tire-finishing stand constructed and organized in accordance with the invention;

Fig. 2 is a plan view of the showing in Fig. 1;

Fig. 3 is an end view of the tire stand shown in Figs. 1 and 2 and looking in the direction of the appended arrow near Fig. 1 and Fig. 4 is a fragmentary detail view partly in section of the clutch.

Corresponding parts in all the figures are designated by the same reference characters.

Referring with particularity to the drawing, in the embodiment of the invention therein shown, A designates a rotatable work holding chuck, B designates power transmission means, C designates a rotatable support for said chuck A, D designates means for securing the rotatable support C in any position of adjustment, E designates means for operating the chuck A, and F designates a supporting frame.

The rotatable chuck A may be of any preferred form or construction and may comprise a plurality of radial arms 4 from each of which may be projected a member 5 and such member 5 may be adapted for engagement with a standard core such as is usually employed in tire carcass building, the outer end of each of such members 5 being pointed as at 5ª. The invention is not concerned with the specific means of projecting the members 5ª for engagement with the core, not shown, as any well known means may be employed for this purpose. The arms 4 all merge into a central hub 6 fixed to a short shaft 7 at one end of such shaft. The other end of the shaft 7 is threaded as at 8 and provided with a wing nut or the like 9, a friction cone 10 being secured to the shaft as at 11 at a point between the wing nut and the hub 6 of the chuck A. A further cone 12 is slidably mounted on the shaft 7 and in position to be pressed inwardly by the wing nut 9 when the same is rotated about the shaft 7 in a direction to screw the same farther on the shaft. The friction cones 10 and 12 face each other and confine between them a bevel gear 13 the hub 14 of which is bored to receive the shaft 7 and is formed at each side with a conical recess 15, the recesses 15 being formed one to match the cone 10 and the other to match the cone 12. By screwing or unscrewing the wing nut 9 the bevel gear may be clamped to the shaft or released from the same for independent rotation. A bearing or journal box 16 is provided for the shaft 7 between the hub 6 of the chuck A and the friction cone 10 and such journal box 16 may have a reduced portion as at 17 taking into the supporting member C. The power transmission means B preferably comprises a horizontal rotatable power transmission shaft 18 journaled near its ends on the rotatable support C as at 19 and 20, a bevel pinion 21 fixedly mounted on said shaft 18 and meshing with the bevel gear 13, a spur pinion 22 fixedly mounted on the end of the shaft 18 opposite the end at which the pinion 21 is mounted, an idler or intermediate gear 23 rotatably mounted on the support C, a drive pinion 24 mounted upon a fixed shaft 24ᵇ and a motor pinion 24ᶜ. The supporting means C preferably consists of a supporting arm 25 bored at one end as at 26ª to receive the journal bearing 17 and journaled at its other end in the main frame F as at 26. A nut and washer retaining device 27 is applied to the end of the arm 25 where it extends through the main frame F, and a shoulder 28 is provided on the cylindrical journaled portion 26 of the arm 25 the shoulder being spaced from the main frame to properly aline and maintain the intermediate gear 23 in its plane of rotation about the cylindrical portion 26 of the arm 25. The arm 25 is bent at the shoulder 28 to extend laterally of the cylindrical portion 26 as at 29 and again bent to extend away from the cylindrical portion and parallel to the axis thereof as at 30 and such arm 25 is again curved inwardly as at 31 to hold the chuck A in a plane of rotation coinciding with the axis of the cylindrical portion 26 as will be readily understood by reference to Fig. 2 of the drawing. The journal bearings 19 and 20 for the transmission shaft 18 preferably project from the arm 25 to properly support the shaft 18. The spur pinion 22 on the shaft 18 is provided with teeth 22ª taking into teeth 23ª provided on the intermediate gear 23 and adjacent to one end of said teeth 23ª, the pinion 22 having a smaller face than the gear 23. The teeth 24ª of the drive pinion 24 mesh with the teeth 23ᵃ of the intermediate gear 23 and only at the ends of the teeth 23 opposite the ends engaged by the pinion 22. The supporting arm 25 being rotatably mounted in a suitable bore 26 provided in the main frame F the arm is arranged to project horizontally from a boss 32 provided on said main frame F, the main frame F ranging downwardly and to a point beneath the chuck A as at 33, the same terminating in an enlarged flange 34 having a flattened bottom face 35 whereby the entire tire finishing stand is supported from a suitable foundation or floor.

The clamping means D preferably comprises a screw shank 36 and an operating handle 37 therefor, the screw shank being threaded as at 36ᵃ into a threaded orifice 36ᵇ provided in the boss 32 so that upon rotation of the handle or lever 37 the threaded shank will be brought into engagement with the cylindrical portion 26 of the supporting arm or member C when the lever 37 is rotated in the proper direction. Opposite rotation of the lever 37 will cause the screw to be moved away from the cylindrical portion 26 and free the same. The operating means E is shown as an electric motor 38 secured to the portion 33 of the main frame F as at 39, said motor having a shaft 40 upon one end of which is fixed the spur pinion 24ᶜ. The motor is so arranged on the frame portion 33 that the pinion 24ᶜ lies in the proper plane to engage with the drive pinion 24 which engages the teeth 23ᵃ of the intermediate gear 23 in a plane other than the plane of rotation of the pinion 22.

The operation, method of use and advantages of the improved tire-finishing stand will be readily understood from the foregoing description taken in connection with the accompanying drawing and the following statement:

A tire carcass or the like (not shown) being made or finished upon a suitable core or the like (not shown) may be mounted for rotation upon the chuck A by manipulating the expanding means of such chuck to force the members 5 into engagement with the core, and upon application of power to the device as by means of the operating means or motor E, the pinion 24 will be rotated and drive the intermediate gear 23 and through it the pinion 22 together with the transmission shaft 18 and the bevel pinion 21. Power is further transmitted through the bevel pinion 21 and the bevel gear 13 to the shaft 7, thus causing the rotation of the shaft 7 and the chuck A mounted thereon, together with the core and tire which may be in position on the chuck A. When it is desired to shift the plane of rotation of the chuck A and the tire carcass or the like carried thereby, all that is necessary is to release the supporting arm 25 by manipulating the screw shaft 36 through its handle 37 and simply rotate the arm 25 about the axis of its cylindrical portion 26, as by pressure applied to the tire casing mounted on the chuck, or any other portion of the arm 25 or parts carried thereby. When the chuck and the tire or other work carried thereby has been moved into the proper plane of rotation, the screw shaft 36 may be rotated in the proper direction to clamp the parts in the newly assumed position. After any particular operation has been performed on a tire carcass or the same has been finished, it may be removed from the stand, together with its core, by contracting or retracting the members 5 into the arms 4 of the chuck, and another tire carcass with its core may be positioned for rotation on the stand by again expanding the chuck or the members 5 thereof. As the chuck is moved to a new plane of rotation as by rotating the supporting arm 30 about its axis, the pinion 22 on the transmission shaft 18 carried by the arm 25 will be rotated about the idler or intermediate gear 23 which is rotatably mounted on the cylindrical portion 26 of the arm 25 and confined between the shoulder 28 and the journal bearing 32, and a complete revolution of the arm 28 about its axis may be made due to the relatively narrow face of the pinion 22 which permits the pinion 22 to pass the pinion 24, clearance being provided, as between the pinion 22 and the pinion 24, to this end.

In case it is desired to disconnect the power so that the chuck and the tire mounted thereon may be stopped or rotated manually instead of by power applied to the transmission gear, the wing nut 9 may be unscrewed and the bevel gear 13 released from the friction cones 10 and 12, thus freeing the shaft 7 from the bevel 13 and when it is again desired to apply power to the chuck shaft 7 to rotate the same and the work carried by the chuck, the wing nut may be moved in the proper direction to tighten the cones 10 and 12 and clamp the bevel gear 13 between said cones to cause the rotation of the shaft 7 with the same.

Having thus disclosed our invention, we claim and desire to secure by Letters Patent:

1. A device of the character described, including a support, a horizontal chuck carrying arm journaled upon the support and rotatable about a horizontal axis, a shaft carried by the free end of said arm and extending transversely with respect thereto, said shaft being provided with a conical collar and a threaded end, a nut fitted upon the threaded end and having a conical face which is opposed to the conical collar, a gear arranged upon the shaft and interposed between the collar and the nut, said gear having recessed faces to receive the collar and nut, a chuck carried by the transverse shaft, and means coöperating with the gear to drive the chuck at all positions of the chuck carrying arm.

2. A device of the character described, including a supporting frame, a horizontally extending chuck carrying arm rotatable about a horizontal axis, a comparatively wide gear wheel mounted concentric with the axis of the chuck supporting arm, a drive pinion engaging the gear wheel at one end thereof, a second pinion carried by the chuck carrying arm and engaging the gear wheel at the opposite end thereof, the second pinion being mounted to remain in mesh with the gear wheel at all positions of the chuck carrying arm, a chuck supported upon the chuck carrying arm, and a driving connection between the second pinion and the chuck.

In testimony whereof, we have signed our names to this specification in the presence of two subscribing witnesses.

ARTHUR J. SAVAGE.
HOWARD I. MORRIS.

Witnesses:
CHARLES SPERECKEL,
M. MEABERY.